(12) United States Patent
Fukushima et al.

(10) Patent No.: US 7,516,868 B2
(45) Date of Patent: Apr. 14, 2009

(54) FUEL TANK STRUCTURE

(75) Inventors: Yoshitaka Fukushima, Tokyo (JP);
Hiroshi Takahashi, Tokyo (JP); Hiroshi Yamamoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 296 days.

(21) Appl. No.: 10/813,054

(22) Filed: Mar. 31, 2004

(65) Prior Publication Data

US 2004/0195247 A1 Oct. 7, 2004

(30) Foreign Application Priority Data

Apr. 2, 2003 (JP) .......................... P.2003-098913

(51) Int. Cl.
*B60P 3/00* (2006.01)
(52) U.S. Cl. ..................................... 220/562
(58) Field of Classification Search .............. 220/564, 220/562, 669, 608, 601
See application file for complete search history.

(56) References Cited

U.S. PATENT DOCUMENTS

| | | | | |
|---|---|---|---|---|
| 2,208,621 A | * | 7/1940 | Ball et al. | 220/562 |
| 5,221,021 A | * | 6/1993 | Danna | 220/563 |
| 6,135,306 A | * | 10/2000 | Clayton et al. | 220/564 |
| 6,298,540 B1 | * | 10/2001 | Benjey et al. | 29/452 |
| 6,371,153 B1 | * | 4/2002 | Fischerkeller et al. | 137/265 |
| 6,571,978 B1 | * | 6/2003 | Puempel et al. | 220/562 |
| 2002/0053568 A1 | * | 5/2002 | Balzer et al. | 220/4.14 |
| 2003/0057212 A1 | * | 3/2003 | Fish et al. | 220/562 |
| 2003/0230583 A1 | * | 12/2003 | Magyar | 220/562 |

FOREIGN PATENT DOCUMENTS

| | | |
|---|---|---|
| DE | 101 35 328 A1 | 2/2003 |
| EP | 0203711 B1 | 7/1989 |
| EP | 0 572 038 A1 | 6/1993 |
| EP | 0875411 A2 | 11/1998 |
| EP | 0875411 A3 | 3/2000 |
| JP | 50-085715 | 12/1973 |
| JP | 56-139622 | 10/1981 |
| JP | 10-018929 | 1/1998 |
| JP | 10-230822 | 9/1998 |
| JP | 2000-141295 | 5/2000 |
| JP | 2003-118403 A | 4/2003 |
| JP | 2004-9827 | 1/2004 |

OTHER PUBLICATIONS

Japanese Office Action Mailed Jan. 15, 2008 and English Translation Thereof.

* cited by examiner

*Primary Examiner*—Stephen Castellano
(74) *Attorney, Agent, or Firm*—McGinn IP Law Group, PLLC

(57) ABSTRACT

A fuel tank structure structured by an upper member and a lower member characterized in that a display portion of a working position of a waste fuel hole is provided at an outer surface of the lower member in correspondence with a fuel remaining portion and operation of boring the waste fuel hole by a spearhead-shaped drill or the like can easily be carried out by clearly recognizing a position of a portion at which remaining fuel is liable to remain.

10 Claims, 3 Drawing Sheets

FUEL TANK STRUCTURE

BACKGROUND OF THE PRESENT INVENTION

1. Field of the Present Invention

The present invention relates to a fuel tank structure provided for storing a liquid fuel of gasoline or the like in an automobile.

2. Description of the Related Art

A vehicle is installed with a fuel tank for storing and supplying a gasoline or the like as a fuel. However, a leakage of the fuel having a high volatility and flammability is extremely dangerous for an operation of scrapping a used vehicle. Therefore, it is needful to drain out a total amount of the fuel from the fuel tank prior to the scrapping operation. Generally, in order to drain out the fuel from the fuel tank, a hole is formed at a bottom surface. However, in recent years, since a chamber module formation including a fuel pump or the like is developed and an inner structure of the fuel tank is complicated, in order to firmly drain out the total amount of the fuel, a scrapping efficiency is liable to be lowered and also an operational environment is liable to be deteriorated and a problem remains also in view of safety. Hence, there has been proposed a processing facility for draining out a fuel in scrapping such a used vehicle (refer to, for example, JP-A-10-230822, shown below).

A simple explanation will be given of Patent Reference 1, described above, in reference to FIG. 4. A fuel receiving chamber 17 is moved up and down by a base seat 13. When the fuel receiving chamber 17 is moved up, the fuel receiving chamber is brought into a close contact with a fuel tank 20 by a sealer 19. Further, a spearhead-shaped penetrating device 18 is moved up and down by a piston 15. When the device 18 is moved up, the device 18 penetrates the fuel tank 20 to open a hole and a remaining fuel inside of the fuel tank 20 is drained out to the fuel receiving chamber 17. The drained-out fuel is recovered from a draining port 11 of the fuel receiving chamber 17 to a salvage tank 27 via a pipe 24 and a valve 22.

When a fuel level of the recover tank 27 reaches a predetermined level, the valve 22 is closed by a level meter 23. Further, a nitrogen gas is supplied from a nitrogen gas bomb 14 to the fuel tank 20 via a valve and a colder 25 and supplied to the fuel receiving chamber 17 via the pipe 24 and the valve 22 to thereby purge by the nitrogen gas. A gas concentration measuring instrument 16 measures a gas concentration at an inside of the fuel tank 20 in order to advance (or transfer) to a next station after recognizing that a gas of the fuel is sufficiently reduced.

By such a processing facility of the used vehicle (old vehicle), the fuel can efficiently and safely be drained out at inside of an independent (or separate) building facility of a fireproof structure or the like. However, such a processing facility needs a large-scaled facility and requires an enormous expense, further, in order to bore a fuel draining hole at an optimum position of the fuel tank 20 (a position of installing a chamber module including a fuel pump or the like which is easy to store a remaining fuel or the like) in correspondence with various regulations for fuel tanks, a position of the piston 15 above the base seat 13 needs to incessantly control and still the operational efficiency cannot be regarded to be sufficient.

SUMMARY OF THE PRESENT INVENTION

It is an object of the present invention to provide a sufficient fuel storing structure by resolving the various problems in the processing facility of the used vehicle of the related arts and capable of draining out a total amount of the fuel by boring a fuel draining hole at an optimum position securely and easily under a high rigidity without a special facility.

For that purpose, a fuel tank structure of the present invention comprises a display portion of a working position of a waste fuel hole provided at an outer surface of a fuel tank in correspondence with a fuel remaining portion. Further, in the present invention, the display portion may be so disposed that it is placed right below a chamber module arranged at inside of a fuel tank and surrounds the chamber module. Further, in the present invention, the display portion has a bead portion forced by projecting a predetermined amount thereof to an inner side of the fuel tank. Further, in the present invention, the bead portion includes a plurality of noncontinuous bead portions. According to the present invention, a position of installing the chamber module or the like at which a remaining fuel is liable to be stored is easily recognized by the display portion and the fuel draining hole is firmly bored to thereby enable to drain out a total amount of the fuel. Further, by constituting the working position display portion by a bead structure, positioning in integrating the chamber module or the like is facilitated and further, a rigidity in boring the fuel draining hole is ensured and boring operation is facilitated.

BRIEF DESCRIPTION OF THE DRAWINGS

FIG. 1 shows a first embodiment of a fuel tank structure of the present invention.

FIG. 3 shows a second embodiment of the fuel tank structure of the present invention.

DETAILED DESCRIPTION OF THE PRESENT INVENTION

Figure 1A:
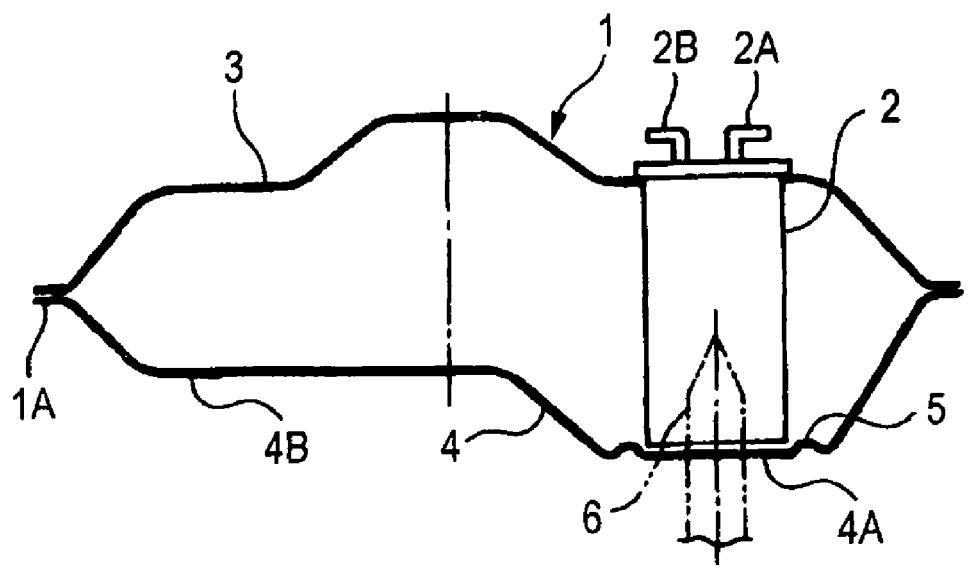
FIG. 1A is a total sectional view of a fuel tank.
Figure 1B:
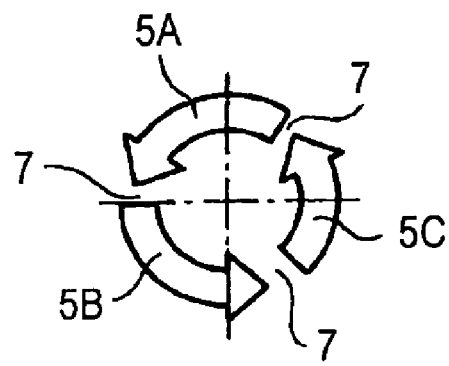
FIG. 1B is a plane view of a display portion of a working position.
Figure 1C:
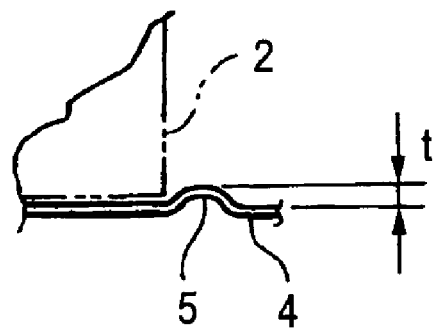
FIG. 1C is a sectional view of the display portion.
Figure 2:
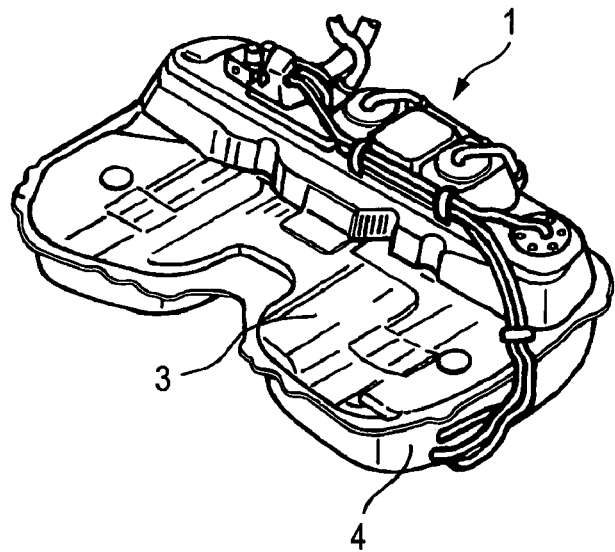
FIG. 2 is a perspective view of the fuel tank structure of the first embodiment.

An explanation will be given of embodiments of the present invention in reference to the drawings as follows. FIGS. 1 and 2 show a first embodiment of a fuel tank structure of the present invention, FIG. 1A is a sectional view of a fuel tank, FIG. 1B is a plane view of a display portion of a working position, FIG. 1C is a sectional view of the working position display portion, and FIG. 2 is a perspective view of the fuel tank. As shown by FIG. 1A, a basic structure of a fuel tank structure of the present invention comprises an upper member 3, a lower member 4, and a display portion 5 of a working position of a waste fuel hole provided at an outer surface (which is a bottom portion at the lowest position and preferably a position of a chamber module 2) of the lower member 4.

A detailed description will be given as follows. The first embodiment is applied to the fuel tank of a normal type formed with a plurality of bottom portions 4A and 4B, a single bottom portion 4A having the lowest position in a lower member 4. A fuel tank 1 is made by connecting the upper member 3 and the lower member 4 respectively having different shapes and molded by separate steps by welding or the like at an abutting peripheral edge 1A. Before connecting the upper member 3 and the lower member 4, a bead portion 5 is formed at the bottom portion 4A constituting the lowest position in the lower member 4. As shown by FIG. 1C, preferably, the bead portion 5 is formed by projecting a predetermined amount t to an inner side of the fuel tank to constitute a display function and ensure a rigidity and prevent the display function from being deteriorated even by coating an undercoat. Further, the bead portion 5 is formed in a shape of a divided ring as shown by FIG. 1B. In the illustrated example, the bead portion 5 has a first bead portion 5A, a second bead portion 5B and a third bead portion 5C in a mode indicated by arrow marks divided in three (indicating a recycle). Therefore, cut portions 7 are formed among the respective bead portions 5A, 5B, 5C.

In producing the fuel tank 1 by connecting the lower member 4 having the bead portion 5 formed in this way and the upper member 3, a lower end portion of the chamber module 2 installed at the upper member 3 and containing a fuel pump or the like is aligned and set to a proper position to the ring-shaped bead portion 5. Normally, a predetermined clearance is set between a lower surface of the chamber module 2 and the lower member 4. Further, reference number 2A in FIG. 1A designates a fuel pipe for supplying the fuel to an engine and a reference number 2B designates a vent pipe connected to a vent line. In using the fuel tank in the vehicle, the fuel at an inside of the fuel tank 1 is introduced to the fuel pump, not illustrated, via a side wall, a hole of the lower surface of the chamber module 2, and supplied to the engine via the fuel pipe 2A and a high pressure gas due to a high temperature at the inside of the fuel tank 1 is introduced to a canister or the like at the vent line via the vent pipe 2B.

A used vehicle which will not be used forever as a vehicle is scrapped and it is necessary to drain out a total amount of the fuel from the fuel tank 1 since there is a concern of inflaming a remaining fuel in scrapping the vehicle. According to the first embodiment, there is formed the display portion 5 of the working position for specifying/clearly indicating at least a position of the outer surface of the bottom portion 4A at the lowest position of the lower member 4 in correspondence with the fuel remaining portion, preferably, a position of the chamber module 2 (arranged with one way valve or the like other than a fuel pump and the remaining fuel is difficult to be discharged). Therefore, operation of boring (or drilling) a waste fuel hole by a spearhead-shaped drill 6 may be carried out as shown by chain lines of FIG. 1A.

At this occasion, when the display portion 5 is provided with the bead structure formed by projecting the predetermined amount t, the bottom portion 4A to be bored can be ensured with a predetermined rigidity and the boring operation can firmly be carried out Thereby, the fuel can be drained out via the waste fuel hole from the bottom portion of the chamber module 2 at which the remaining fuel is liable to be stored. Further, also the remaining fuel stored to the bottom portion 4A on an outer side of the bead portion 5 is made to flow to the waste fuel hole via the cut portions 7 among the respective bead portions 5A, 5B, 5C structured to divide and the remaining fuel can firmly be drained out. Further, although the working position display portion 5 is formed to project to inside of the fuel tank 1 by the predetermined amount t, the working position display portion 5 is formed to surround the chamber module 2. Therefore, the chamber module 2 is not hampered (or prevented) from being arranged at a vicinity of the lower surface of the fuel tank 1.

Figure 3A:
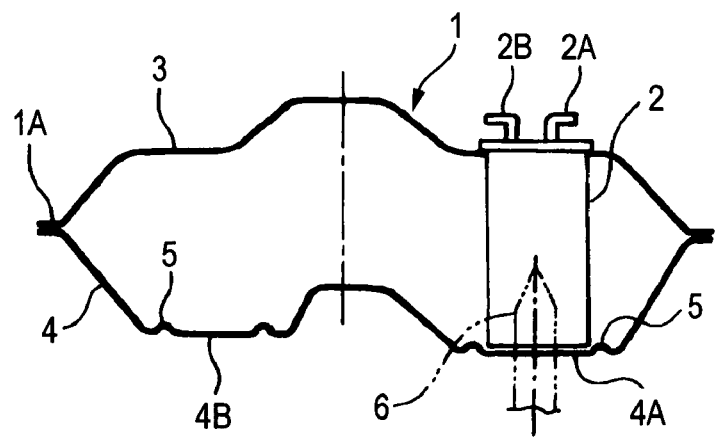
FIG. 3A is a sectional view of the fuel tank.
Figure 3B:
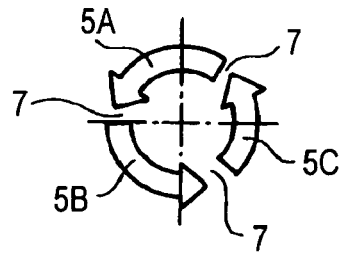
FIG. 3B is a plane view of the display portion.
Figure 4:
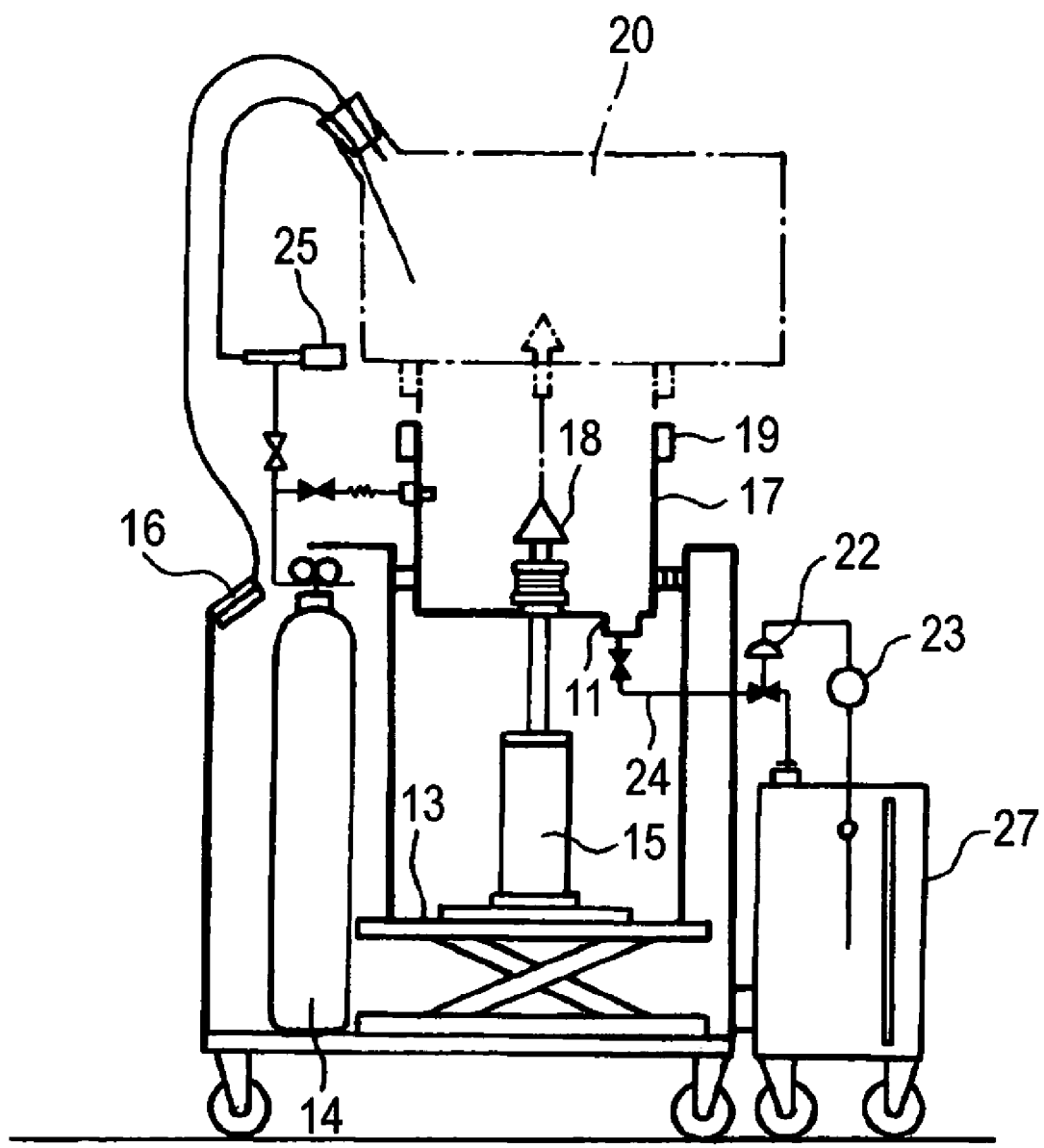
FIG. 4 is an example of a related art of a processing facility for draining out a fuel.

FIG. 3 shows a second embodiment of the fuel tank structure according to the present invention, FIG. 3A is the entire sectional view of a fuel tank and FIG. 3B is a plane view of a display portion of a working position. The second embodiment is an example of being applied to a saddle type tank capable of ensuring a predetermined effective remaining amount of a fuel. The fuel tank 1 of the second embodiment shows a saddle type section in which the bottom portion of the lower member 4 includes two bottom portions of a first bottom portion 4A and a second bottom portion 4B. According to the saddle type fuel tank, even when the fuel on the first bottom portion 4A arranged with the chamber module 2 for containing the fuel pump or the like is exhausted in running, the predetermined effective remaining amount can be ensured on the second bottom portion 4B. Therefore, in emergency, the remaining fuel on the second bottom portion 4B can be sucked (or drawn) by a fuel pump or the like to supply to a combustion chamber by a switching cock or the like.

According to the second embodiment, the working position display portion 5 for the waste fuel hole is formed at the lowest portion of the second bottom portion 4B of the lower member 4 in correspondence with the fuel remaining portion. Preferably, similar to the display portion 5 in the first bottom portion 4A, there is provided a bead portion formed by projecting a predetermined amount thereof to the inner side of the fuel tank. The structure of the chamber module 2 and the bead portion 5 of the display portion on the first bottom portion 4A is similar to that of the above-described first embodiment and therefore, an explanation thereof will be omitted. Since the structure is constructed in this way, other than achieving an effect similar to that of the above-described first embodiment, also with regard to the second bottom portion 4B capable of ensuring the predetermined effective remaining amount, the waste fuel hole can be recognized and the boring operation can easily be carried out for draining out the remaining fuel.

Although an explanation has been given of the respective embodiments of the present invention as described above, within the range of the gist of the present invention, there can pertinently be selected the shape of the fuel tank (a pertinent divided mode can be adopted other than the mode of dividing the upper member and the lower member upwardly and downwardly. Further, a structure relating to a main portion and the bottom portion of the tank can pertinently be adopted.), the type of the fuel tank (having a single one of the bottom portion, the saddle type having the two bottom portions or the like), the shape of the display portion of the waste fuel hole (other than the three arrow marks signifying the recycle in the bead shape projected to the inner side of the tank, a pertinent shape provided with cut portions can be adopted. Further, there can be structured with the bead portion projected to the outer side (lower side in the drawing) as the display portion and a positioning auxiliary member of the chamber module on the inner side of the tank of the bead portion. Further, when ineffective remaining of the fuel is to a degree of being able to be disregarded, a continuous bead portion can be structured without being divided), further, when it is not necessary to take into account the rigidity in the boring operation, the display portion may not be structured by the projected bead portion) and the like. Further, the display portion of the waste fuel hole may be provided on the outer surface at a portion at which the fuel at inside of the fuel tank is liable to remain in accordance with the shape of the fuel tank, the position of the fuel pump or the like also at other than right below the chamber module or the bottom portion of the fuel tank.

Further, there can pertinently be selected the shape of the chamber module (a square cylindrical shape, a spherical shape or the like other than the circular cylindrical shape), the type (the method of arranging the fuel pump and the one way vale or the like), the structure related to the display portion of the bead portion or the like (other than being positioned as dimensions of respective portions such that the chamber module is matched to the inner side of the ring-shaped bead portion without excess and deficiency, or after setting to position the lower end edge of the chamber module by being guided by an inclined face of the bead portion, the bead portion is arranged at the surrounding of the chamber module with more or less allowance), the amount of projecting the bead portion as the display portion, a mode of catching the fuel drained out via the waste fuel hole and the like.

Although the present invention has been described in detail with reference to specific embodiments, it is clearly understood to those skilled in the art that various changes and modifications can be made without departing from the spirit and scope thereof.

This application is based on Japanese Patent Application No. 2003-098913, filed on Apr. 2, 2003, the content of which is incorporated herein by reference.

As has been described in details, according to the present invention, by providing the working position display portion of the waste fuel hole at the outer surface in correspondence with the fuel remaining portion, the position of the portion at which the remaining fuel is liable to remain can clearly be recognized and the boring operation of the waste fuel hole by the spearhead-shaped drill or the like can easily be carried out.

Further, when the display portion is installed in the mode right below the chamber module arranged at an inside of the fuel tank and surrounding the surrounding of the chamber module, the position of the chamber module at which the remaining fuel is liable to remain can easily be recognized from outside and the boring operation of the waste fuel hole along with the chamber module can easily be carried out by the spearhead-shaped drill or the like. Further, when the working position display portion is the bead portion formed by projecting the predetermined amount to the inner side of the fuel tank, the bead portion can be utilized as the positioning member in attaching the chamber module or the like to the fuel tank, the boring operation can firmly and securely be carried out by ensuring the predetermined rigidity at the bottom portion to be bored and the fuel can be drained out from the bottom portion of the chamber module at which the remaining fuel is liable to be stored via the waste fuel hole.

Furthermore, when the bead portion is characterized by being structured by the plurality of noncontinuous bead portions, also the remaining fuel stored to the bottom portion on the outer side of the bead portion is also made to flow to the waste fuel hole via the cut portions among the noncontinuous bead portions and the remaining fuel can firmly be drained out. In this way, there can be provided the fuel tank structure capable of draining out the total amount of the fuel by boring the fuel draining hole at the optimum position firmly and easily under the high rigidity without a special facility.

What is claimed is:

1. A fuel tank structure comprising:
   a fuel tank including:
   a display portion of a working position for locating a waste fuel hole provided at an outer surface of said fuel tank in correspondence with a fuel remaining portion,
   wherein the display portion comprises a bead portion formed by projecting a predetermined amount of the bead portion to an inner side of the fuel tank, and
   wherein the bead portion is disposed immediately below and apart from the chamber module including a fuel pump arranged on the inside of the fuel tank, the bead portion including a plurality of arcuate bead portions arranged in a circular pattern and cut portions formed among the respective bead portions, the arcuate bead portions respectively providing an arrow mark indicating a recycle thereon.

2. The fuel tank structure according to claim 1, wherein the cut portions directly connect an inside of an area surrounded by said bead portions and an outside of the area.

3. A fuel tank structure, comprising:
   a fuel tank including:
   a lower member including a plurality of bottom portions each constituting a portion of a plane, including a single bottom portion constituting a lowest planar position in the lower member; and
   a display portion of a working position for locating a waste fuel hole, the display portion being provided within a lowest outer surface of the single bottom portion constituting the lowest planar position of the fuel tank in correspondence with a fuel remaining portion,
   wherein the display portion comprises a bead portion formed by projecting a predetermined amount of the bead portion to an inner side of the fuel tank, wherein the bead portion is visible from an outer side of the fuel tank, and
   wherein the bead portion is disposed immediately below and apart from a chamber module including a fuel pump arranged on the inside of the fuel tank, the bead portion including a plurality of arcuate bead portions arranged in a circular pattern and cut portions formed among the respective bead portions, the arcuate bead portions respectively providing an arrow mark indicating a recycle thereon.

4. The fuel tank structure according to claim 3, further comprising:
   another display portion of another working position for locating another waste fuel hole, the another display portion being provided at another bottom outer surface of another bottom portion of the plurality of the bottom portions of the fuel tank in correspondence with another fuel remaining portion.

5. The fuel tank structure according to claim 4, wherein the another display portion is disposed below a chamber module arranged on the inside of the saddle type fuel tank and surrounds the chamber module.

6. The fuel tank structure according to claim 4, wherein the another display portion comprises another bead portion formed by projecting a predetermined amount of the bead portion to an inner side of the fuel tank.

7. The fuel tank structure according to claim 5, wherein the another display portion comprises another bead portion formed by projecting a predetermined amount of the bead portion to an inner side of the fuel tank.

8. The fuel tank structure according to claim 6, wherein the another bead portion comprises a series of non-continuous bead portions.

9. The fuel tank structure according to claim 3, wherein another bead portion comprises a series of non-continuous bead portions.

10. The fuel tank structure according to claim 3, wherein the cut portions directly connect an inside of an area surrounded by said bead portions and an outside of the area.

* * * * *